Oct. 28, 1930.  G. WHARTON  1,779,760
SHOVEL HANDLE
Filed March 18, 1929
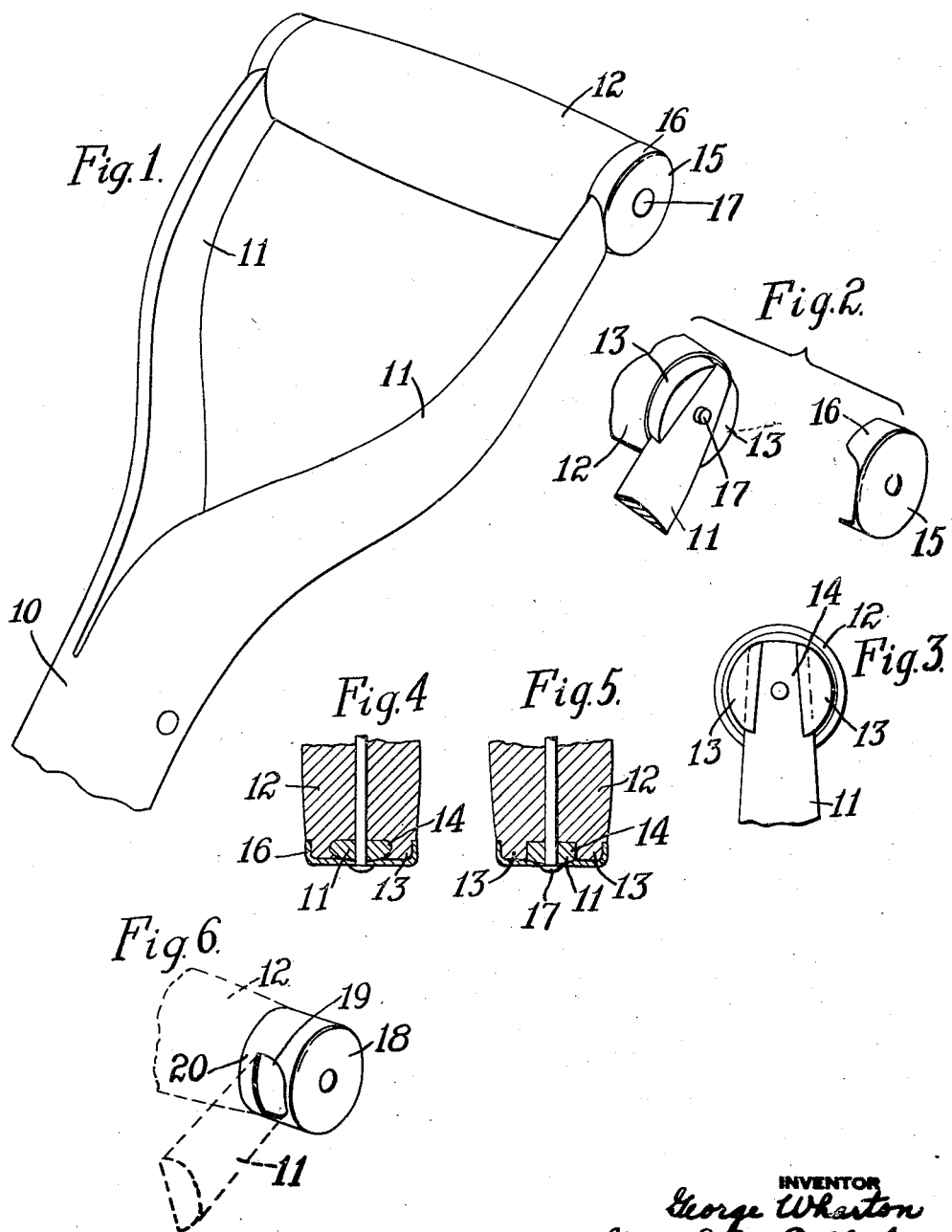

Patented Oct. 28, 1930

1,779,760

UNITED STATES PATENT OFFICE

GEORGE WHARTON, OF MONTPELIER, INDIANA, ASSIGNOR TO HUBBARD & COMPANY, A CORPORATION OF PENNSYLVANIA

SHOVEL HANDLE

Application filed March 18, 1929. Serial No. 347,839.

This invention relates to shovels and more particularly to shovel handles of the split D type.

In the ordinary form of shovel handle, wherein the grip is made from the same piece of wood as the side bars, much more timber is used than in the split D type, and the grain of the grip runs crosswise and, as a consequence, these handles are unsatisfactory due to splitting of the grip bar. The split D handle, in which the handle of the shovel is split and a grip bar secured between the split ends thereof, overcomes these objectionable features, but it has been difficult to provide a handle of this type in which the grip will not become loose and twist in the hand of the operator between the split portions of the handle, except by the use of expensive metal reinforcing arms.

An object of this invention is to provide a split D shovel handle of improved construction and arrangement, which can be manufactured at a low cost.

A further object is to provide a handle of the type set forth of such construction and arrangement that the grip will be positively held against displacement and against twisting with relation to the shovel handle.

These and other objects which will be apparent to those skilled in this particular art are accomplished by means of the invention illustrated in the accompanying drawings in which Fig. 1 is a perspective view of a shovel handle constructed in accordance with one embodiment of this invention. Fig. 2 is a similar view of a portion thereof showing the ferrule removed. Fig. 3 is a side elevation illustrating the joint between the grip bar and a handle. Figs. 4 and 5 are transverse sectional views and Fig. 6 is a perspective view illustrating a modified form of ferrule.

The particular embodiment of this invention which has been chosen for the purposes of illustration contemplates the provision of a grip bar having ends formed so as to engage and interlock with the ends of the shovel handle in such a manner as to positively prevent rotation of the grip with relation to such handle. In its preferred form the joint between the handle and the grip, at each end of the grip as is, of course, understood, is of such construction that the parts are held against separation and against relative twisting as a result of the inherent formation and co-operation of the associated parts. The design of the joint is such that the co-operating parts of the different members each reinforces the other parts and bind upon each other so as to produce a rugged structure of exceptional strength. Separation of the parts can occur only by movement of the grip in one direction with relation to the handle and the grip is definitely locked against such movement by an enclosing and protecting ferrule which is riveted in place to cover the co-operating parts. The formation of the interlocking members is such as to completely fill the interior of the ferrule so as to prevent denting or destruction of the latter by blows or the like.

As illustrated, the present invention is shown in connection with the shank 10 of a shovel handle bar split to form handles 11, the upper ends of which are tapered as indicated in Figs. 2 and 3. Each end of a grip 12 is provided with outwardly projecting lugs 13, the outer surfaces of which are preferably rounded and the inner faces of which co-operate to form a handle receiving slot 14 which is tapered so as to snugly receive the associated end of the handle 11. The slot is of such depth that the outer face of the lugs 13 is substantially flush with the outer face of the handle 11. As illustrated in Fig. 4, the slot 14 is of dovetail construction, since the lugs have arcuate shaped undercut inner faces and taper longitudinally of the grip so as to form a double interlock between the grip lugs 13 and the handle such as to prevent movement of the handle out of the slots by any springing thereof away from the grip. Fig. 5 illustrates a straight sided slot which is tapered in the direction of its length only.

The joint forms an effective interlock between the grip and the handles 11 so as to effectively hold the grip against rotation with relation to the handles and against any separation therefrom except by a longitudinal pull away from the handles, in an upward direction as illustrated in Fig. 3.

Such movement is prevented in the finished handle and the lugs 13 are forced tightly against the end 11 by the dish shaped ferrule 15 having the tapered rim 16 which is cut away at one side to receive the handle 11 at the underside of the grip 12, as shown in Figure 1. A through rivet 17 extends through the grip bar 12, the handle 11 and the tapered ferrule 15, forcing all parts into locking engagement.

The formation of the lugs 13 with their rounded outer surfaces, and the substantially flush faces of the bar 11 and the lugs 13, serve to completely fill the interior of the ferrule 15 so that the latter will not be dented or materially affected by blows which it may receive. The beveled slot and handle 11 and the dovetail connection therebetween when the latter is used, serve to securely bind the parts together so as to positively prevent any relative motion between the grip and handles, except in a direction directly away from the handles 11 on the part of the grip member 12, and the grip member is effectively locked against such movement by the ferrule 15.

If it is desired to provide a ferrule having more strength than that illustrated in Fig. 2, a ferrule 18, see Fig. 6, having an opening 19 therein for receiving the handle 11 and a continuous ring 20 for completely surrounding the grip 12, can be provided.

What I claim as new and desire to secure by Letters Patent is:

1. A split D shovel handle having a grip formed with handle engaging, slot forming lugs for receiving the upper ends of a handle therebetween, said slot tapering longitudinally of said grip and having arcuate shaped undercut inner faces.

2. A shovel handle having in combination a grip bar formed at each end with a pair of slot forming lugs shaped so as to provide a tapered dovetail slot therebetween, a handle having a tapered beveled end received in said slot, a ferrule surrounding and covering said lugs and the end of said handle and means for securing said ferrule to said grip.

3. A split D shovel handle having a grip formed with handle engaging tapered slot forming lugs for receiving the upper ends of a handle therebetween, the inner faces of said lugs being undercut and tapering longitudinally of said grip.

4. The combination in a shovel handle, of a grip bar having tapered lugs forming a dovetail slot on each end thereof, tapered beveled handle portions adapted to be received in said slots the outer face of said handle ends being substantially flush with the top of said lugs, and means for rigidly securing said handles to said grip.

5. A shovel handle having in combination a grip bar, a pair of lugs on each end of said grip bar having longitudinally tapering undercut inner faces forming a dovetail slot therebetween, a handle having a tapered beveled end adapted to be received in said slot, the outer face of said handle end being substantially flush with the top of said lugs, a ferrule surrounding and covering said lugs and the end of said handle and means for securing said ferrule to said grip bar.

In testimony whereof, I have hereunto subscribed my name this 11 day of March, 1929.

GEORGE WHARTON.